United States Patent
Milojicic et al.

(10) Patent No.: US 12,379,909 B2
(45) Date of Patent: Aug. 5, 2025

(54) AUTOMATED PROGRAM CONVERSION FOR HETEROGENEOUS AND FAAS COMPUTING WITH MINIMAL HUMAN INTERVENTION

(71) Applicant: HEWLETT PACKARD ENTERPRISE DEVELOPMENT LP, Spring, TX (US)

(72) Inventors: Dejan S. Milojicic, Milpitas, CA (US); Aditya Dhakal, Milpitas, CA (US); Eitan Frachtenberg, Portland, OR (US); Ninad Sanjay Hogade, Ft. Collins, CO (US); Rolando Pablo Hong Enriquez, London (GB); Gourav Rattihalli, Milpitas, CA (US); Tobias Pfandzelter, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 174 days.

(21) Appl. No.: 18/308,570

(22) Filed: Apr. 27, 2023

(65) Prior Publication Data
US 2024/0362000 A1   Oct. 31, 2024

(51) Int. Cl.
*G06F 8/41*   (2018.01)
*G06F 9/48*   (2006.01)
(Continued)

(52) U.S. Cl.
CPC ............ *G06F 8/447* (2013.01); *G06F 9/4881* (2013.01); *G06N 5/022* (2013.01); *G06N 20/00* (2019.01)

(58) Field of Classification Search
CPC .................. G06F 8/447; G06F 9/4881; G06F 9/50–5094; G06N 5/022; G06N 20/00
See application file for complete search history.

(56) References Cited

U.S. PATENT DOCUMENTS 10,541,942 B2   1/2020   Bernat et al.
10,671,360 B1   6/2020   Todd et al.
(Continued)

FOREIGN PATENT DOCUMENTS

WO   2020/096639 A1   5/2020
WO   WO-2020207595 A1 * 10/2020 ........... G06F 9/5027
(Continued)

OTHER PUBLICATIONS

Pimpalkhute, Varad, et al., MetaFaaS: Learning-to-learn on Serverless, Proceedings of the International Workshop on Big Data in Emergent Distributed Environments, Jun. 2022, 9 pages, [retrieved on Apr. 4, 2025]. Retrieved from the Internet >URL:http://ieeexplore.ieee.org/>.*

*Primary Examiner* — Geoffrey R St Leger
(74) *Attorney, Agent, or Firm* — Trop, Pruner & Hu, P.C.

(57) ABSTRACT

Systems and methods are provided for implementing an iterative function deployment in a Function-as-a-Service (FaaS) computing environment. For example, the system may receive a request to execute a program and convert machine-readable code from the request into functions that are deployable in the FaaS computing environment. The system may determine a first deployment of the functions that defines scheduling and execution tasks, and also an execution metric by a trained prediction model. The system may adjust execution of the plurality of functions and also adjust the execution metric in a second deployment. The system may implement the second deployment at run-time, such that the machine-readable code from the request is executed by the computing components of the FaaS infrastructure in accordance with the second deployment.

20 Claims, 10 Drawing Sheets

(51) Int. Cl.
*G06N 5/022* (2023.01)
*G06N 20/00* (2019.01)

(56) References Cited

U.S. PATENT DOCUMENTS

| | | |
|---|---|---|
| 10,678,522 B1 | 6/2020 | Yerramreddy et al. |
| 11,048,800 B2 | 6/2021 | Sood et al. |
| 2019/0179678 A1* | 6/2019 | Banerjee ............... G06F 9/5055 |
| 2019/0317737 A1* | 10/2019 | Metsch ................. G06N 20/00 |
| 2020/0195520 A1 | 6/2020 | Guim Bernat et al. |
| 2020/0241999 A1 | 7/2020 | Guim Bernat et al. |
| 2021/0021485 A1 | 1/2021 | Guim Bernat et al. |
| 2021/0132935 A1 | 5/2021 | Dinh et al. |
| 2021/0133066 A1* | 5/2021 | He ..................... G06F 11/3466 |

FOREIGN PATENT DOCUMENTS

| | | | |
|---|---|---|---|
| WO | 2021/040582 A1 | 3/2021 | |
| WO | WO-2023007210 A1 * | 2/2023 | ............ G06F 11/302 |

* cited by examiner

AUTOMATED PROGRAM CONVERSION FOR HETEROGENEOUS AND FAAS COMPUTING WITH MINIMAL HUMAN INTERVENTION

BACKGROUND

In cloud computing, portions of a computing environment can be offered as a service to provide interface points for users to the environment, including Infrastructure-as-a-Service (IaaS) and Software-as-a-Service (Saas). With the cloud computing environment configured to meet varying demand by users accessing these services, the environment becomes exceedingly complex and unruly to manage. Better methods of implementing services in cloud computing are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
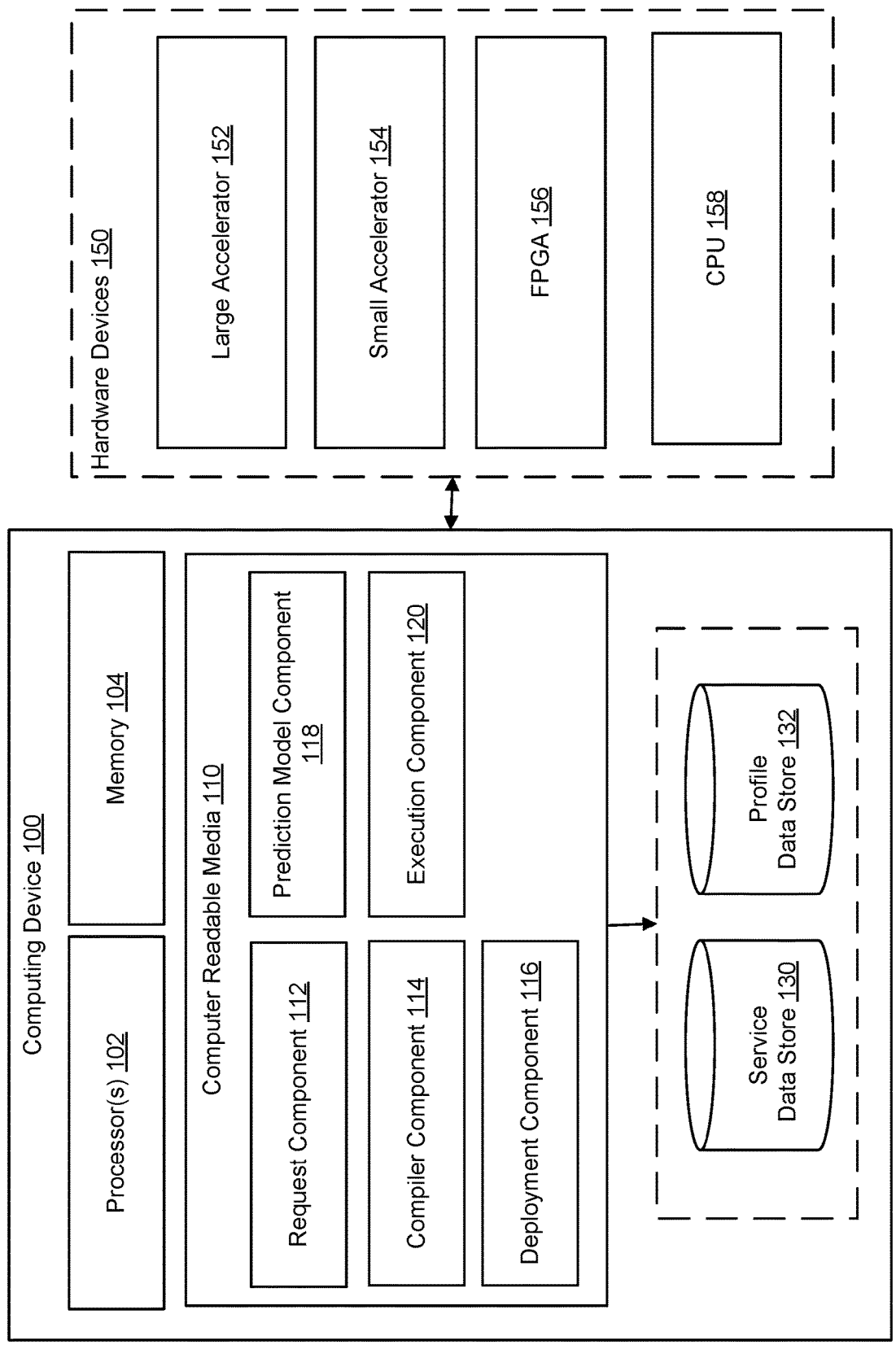
FIG. 1 illustrates a computing device for implementing iterative function deployment in the FaaS computing environment, in accordance with some examples of the disclosure.

The figures are not exhaustive and do not limit the present disclosure to the precise form disclosed.

DETAILED DESCRIPTION

In addition to offering IaaS and SaaS, the cloud computing environment can implement a Function-as-a-Service (FaaS). FaaS computing models allow users to access FaaS infrastructure (e.g., datacenter, servers, racks, nodes, etc.) by issuing remote function calls to the FaaS infrastructure. In this sense, FaaS may be considered "serverless" in that developer users can build and run programs and services by submitting machine-readable code without provisioning or managing servers or the backend infrastructure. Serverless computing may be run in the cloud computing environment for application development and execution. For example, serverless computing may include an orchestration module that identifies infrastructure without relying on instruction from a user to manually identify the infrastructure, even though management and configuration tasks of the infrastructure are configured and initiated by administrative users. FaaS, additionally, provides an event-driven computing architecture, where the system receives machine-readable code from users and the infrastructure automatically triggers functions from specific events. When a system is considered serverless, the system may not require the developer user to address dependencies on a particular operating system (OS) and may only utilize FaaS abstraction components using general-purpose programs, HPC applications and services, artificial intelligence (AI) models, data analytics, etc.

FaaS can also improve and expedite development of heterogenous computing systems (e.g., heterogeneous accelerators like a large accelerator, small accelerator, FPGA, or CPU). Heterogenous computing refers to systems that use more than one kind of processor or core. These systems gain performance or energy efficiency not just by adding the same type of processors, but by adding dissimilar coprocessors, usually incorporating specialized processing capabilities to handle particular tasks. FaaS can deploy heterogenous systems by separating operations performed by the devices in the cloud computing environment into fine-grain computations and abstractions. This enables improved efficiency of infrastructure (e.g., better bin-packing of functions onto accelerators or other devices) and improved composability through abstractions. However, few FaaS platforms support heterogenous computing systems, and these platforms are not optimized for fine-granularity deployment onto these types of computing systems.

To help support serverless computing for the users in a heterogenous computing environment, a decomposition of services in the FaaS infrastructure may be implemented. The services may be analyzed and decomposed by a compiler component in the system or, in some examples, the services may be analyzed and decomposed by a set of instructions that perform operations on behalf of a compiler component (e.g., a "compiler," "compiler component," and the set of operations corresponding with compiler operations may be used interchangeably herein as functions of the compiler component). Compiler-supported decomposition of services in the FaaS infrastructure may separate functions and services that can best match available heterogenous computing systems. The system may deploy these fine-granularity units onto the heterogenous computing systems, dynamically and at run-time, while performing dynamic and iterative adjustments to the decomposition of services or functions, or the deployment of services or functions, as needed. In this way, the system can implement compile-time deployment that utilizes heterogenous computing systems, FaaS, and optimal granularity of the processes. The system may also implement run-time choice of granularity of abstractions to optimize performance of decomposition function to match available hardware and for given streams of data.

Examples of systems and methods described herein can implement iterative function deployment in the FaaS computing environment. For example, the system may receive a request to execute a program (e.g., implemented as machine-readable code to define operations of a program, service, or other set of operations) and convert machine-readable code from the request into functions that are deployable in the FaaS computing environment. The system may determine a first deployment of the functions that defines dispatching/scheduling and execution tasks, and also an execution metric that would be received at run-time if the first deployment were to be executed. The system may determine a second deployment of the functions that adjusts the execution (e.g., by adjusting the decomposition, dispatching, or scheduling of services or functions) and also adjusts the execution metric. The system may implement the second deployment at run-time, such that the machine-readable code from the request is executed by the computing components (e.g., implemented as virtual or physical computing components, including one or more of the set of physical or virtual components including accelerators, FPGA, CPU, and other components) of the FaaS infrastructure in accordance with the second deployment.

As an illustrative example, the user submits a request to execute a program. The request may include code corresponding with machine-executable instructions for a computer-implemented program. The request may also include annotations, in some examples, that identify the decomposition of component suggestions from the user where portions of the program may be deployed. These annotations may be stored as preferences associated with a particular application type (e.g., as program preferences or program metadata in a data store of the system). For example, when a program is received by the system a first time, the annotations may be stored as program metadata along with an application type. When the program, or application type, is received again by the system, it may utilize stored annotations that were used previously by the same program (or a close variant), regardless of the user. In other words, the annotations may assist in the process of decomposing a piece of code into FaaS and accelerator functions. A fully-automated process without annotations may produce a similar result, which may, in some examples, implement a less efficient decomposition of the program without the annotations. In this example, the elements of the program that are reused can also reuse the annotation.

In some examples, the annotations may not be associated to any programmer/developer user, program/application, user, or other particular entity, and rather be associated with preferences at various phases of the deployment lifecycle. The annotations may be determined as preferences and stored with the system by a user who developed program, by an administrative user who manages all programs, or by a user who invokes the program (e.g., data center provider, security administrator, or other users).

The portions of the program may then be decomposed and converted to suggested functions implemented by the FaaS infrastructure (e.g., by the compiler component). The decomposition of the program request into suggested functions may identify implementations by the system to utilize FaaS functions (e.g., that appear "serverless" by the user), heterogeneity, and the right granularity of abstractions to optimize performance goals (e.g., power vs. performance based on program preferences). Once the decomposed program is generated, the dispatcher/scheduler may determine a first deployment of the suggested functions, which are executed by computing components of the FaaS infrastructure. The first deployment may consider, at the time of the deployment, inventory of available hardware and utilization of the hardware.

After the first deployment and before run-time, the dispatcher/scheduler determines execution metrics that would be received if the first deployment were to be executed at run-time. Some metrics include under- or over-utilization of a resource, energy used, sparsity/density of the accessed data, or other metrics of efficient computing. If any of the metrics exceed a permissible threshold value for each metric, the dispatcher/scheduler can determine a second deployment of the suggested functions before run-time. To determine the execution metrics, the functions may be uploaded to a service layer of the FaaS infrastructure, and may be independently dispatched/scheduled and executed on computing components of the FaaS infrastructure.

The decomposition information for the deployment can be recorded and used at run-time. The process can optimize execution of the function calls to the FaaS infrastructure by dynamically deploying individual functions to components (e.g., as an initial deployment, second deployment, etc.) and iteratively determining the best deployment before run-time. When improvements to an execution metric can be made, the system can determine and implement a second deployment of the functions in the FaaS computing environment that incorporate the improvements.

Various technical benefits exist. For example, by decomposing the program from the request into suggested functions, the system can achieve serverless program development and implementation from the view of developer users, heterogeneity by separating operations performed by the heterogenous devices in the cloud computing environment into fine-grain computations and abstractions, and the right granularity of abstractions to optimize performance goals set by the user (e.g., power vs. performance based on program preferences). These components may be suited to run on different hardware and may have different scale-out and performance requirements. The system may leverage heterogeneity by matching the fine-granularity features of serverless implementations to heterogenous computing systems through automated decomposition of programs. At compile time, the scale-out and performance requirements of various program components of the function can run on various heterogeneous hardware. The system may implement the right granularity of abstractions, at run-time, by matching already decomposed function components to the most appropriate available hardware. The selection of the heterogenous computing systems may be determined to optimize speed or accuracy or minimize the number of computing systems that are used to run the function (e.g., based on program preferences stored in the program metadata).

FIG. 1 illustrates a computing device for implementing iterative function deployment in the FaaS computing environment, in accordance with some examples of the disclosure. In computing device 100, processor 102, memory 104, and computer readable media 110 are provided.

Processor 102 may be one or more Central Processing Units (CPUs), semiconductor-based microprocessors, and/or other hardware devices suitable for retrieval and execution of instructions stored in computer readable media 110. Processor 102 may fetch, decode, and execute instructions to control processes or operations for creating and implementing the compiler component. As an alternative or in addition to retrieving and executing instructions, processor 102 may include one or more electronic circuits that include electronic components for performing the functionality of one or more instructions, such as a Graphics Processor Unit (GPU), Field Programmable Gate Array (FPGA), application specific integrated circuit (ASIC), or other electronic circuits.

Memory 104 may include a random access memory (RAM), cache, and/or other dynamic storage devices for storing information and instructions to be executed by processor 102. Memory 104 also may be used for storing temporary variables or other intermediate information during execution of instructions to be executed by processor 102. Such instructions, when stored in computer readable media 110 accessible to processor 102, rendering computing device 100 into a special-purpose machine that is customized to perform the operations specified in the instructions.

Memory 104 may include a read only memory (ROM) or other static storage device for storing static information and instructions for processor 102. Memory 104 may include a magnetic disk, optical disk, solid state disk (SSD), Non Volatile Memory Express (NVMe) or USB thumb drive (Flash drive), etc. for storing information and instructions. In some examples, the information and instructions may be stored in a plurality of data stores, including service data store 130 and profile data store 132.

Computer readable media 110 may be any electronic, magnetic, optical, or other physical storage device that contains or stores executable instructions. Computer readable media 110 may be, for example, Random Access Memory (RAM), non-volatile RAM (NVRAM), an Electrically Erasable Programmable Read-Only Memory (EEPROM), a storage device, an optical disc, and the like. In some embodiments, computer readable media 110 may be a non-transitory storage medium, where the term "non-transitory" does not encompass transitory propagating signals. As described in detail below, computer readable media 110 may be encoded with executable instructions implemented with a plurality of modules, circuits, and engines, including request component 112, compiler component 114, deployment component 116, prediction model component 118, and execution component 120.

Request component 112 is configured to receive a request to execute a program into one or more functions that can be deployed in the FaaS computing environment. The request may include code corresponding with machine-executable instructions for a computer-implemented program. The program received in the request may be stored in service data store 130.

The request may also include annotations, in some examples, that identify the decomposition suggestions from the user where portions of the program may be deployed. These annotations may be stored as program preferences or other program metadata in profile data store 132. The portions of the program may then be decomposed by a compiler component and converted to suggested functions implemented by the FaaS infrastructure, as illustrated with compiler component 114.

As an illustrative example of the annotations in the code, the annotations can start with a computer programmer adding the annotations to the code. The code with annotations can be transmitted to request component 112, which receives the code from the device of the computer programmer. Compiler component 114 can decompose or convert it into the decomposed state, the dispatcher/scheduler of the deployment component 116 can decompose and model the portions of the system that would execute the code. Prediction model component 118 can identify metrics of how each of these portions of the system are implementing and running the deployment. The system can then use an execution metric generated by the prediction model and make changes to the deployment, thus creating a second/third/fourth deployment scenario to improve the execution metric. Execution component 120 can then implement the deployment with the improved execution metrics. Each of these components are discussed in further detail herein.

Compiler component 114 may implement a compiler or other executable program that converts machine-readable code into a plurality of functions that are deployable in the FaaS computing environment. The machine-readable code may correspond with a numerical set of instructions that are readable by a computing device and instruct the computing device to perform particular operations. Each function of the plurality of functions may correspond with a decomposed portion of the machine-readable code and comprise instructions for initiating operations on hardware devices 150 in the FaaS computing environment.

Compiler component 114 can convert machine-readable code into a plurality of functions that runs on various devices. As illustrated herein, compiler component 114 is configured to create a function call for a portion of the machine-readable code to run on remote hardware devices 150, including large accelerator 152, small accelerator 154, Field Programmable Gate Arrays (FPGA) 156, and CPU 158. For example, CPU 158 may comprise various computing devices including Intel® CPU, AMD® CPU, NVIDIA® GPU, AMD® GPU, TPU, and other processors. Hardware devices 150 are provided for illustrative purposes and should not be limiting the features of compiler component 114.

Deployment component 116 is configured to determine functions assigned to a deployment of functions in the FaaS computing environment. For example, the functions generated/decomposed by compiler component 114 from the machine-readable code may be assigned to the first deployment that executes the function correctly at large accelerator 152 and may generate a second deployment that executes a different set of functions correctly at FPGA 156. Deployment component 116 may also determine a plurality of functions that would be optimized to execute efficiently and in a minimal amount of time for the corresponding hardware that is running the corresponding machine-readable code.

In some examples, compiler component 114 may receive an environment variable (e.g., a dynamic string transmitted during run-time operation of the program) that identifies hardware device 150 that can receive the machine-readable code, and convert the machine-readable code to a function (e.g., or set of functions or chain of functions) corresponding with the decomposed portion of the machine-readable code for the environment variable. Deployment component 116 may use the particular function in its deployment corresponding with the environment variable.

Deployment component 116 is also configured to receive execution metrics or other performance data of various computing devices that execute the functions in accordance with the deployment. For example, the execution metrics may include the execution time, processing speed, or other metrics associated with running the function at hardware device 150. The deployment of the plurality of functions in the FaaS environment may be provided as input to a trained prediction model and the execution metrics may be provided as output from the trained prediction model. The training data may comprise past execution metrics to identify the hardware components that should receive deployment instructions to execute for a particular function in order to optimize for execution of the functions, and ultimately the program from the request.

Prediction model component 118 is configured to implement the trained prediction model. The trained prediction model can determine an execution metric of the deployment defining dispatching/scheduling and execution tasks for each function were to be deployed on computing components of the FaaS infrastructure. The execution metric may include, for example, an amount of memory required to store data while executing the function, an amount of memory required to store output after executing the function, an amount of processor time or speed, or other execution metrics. The trained prediction model can provide the execution metrics as an output.

Prediction model component 118 may be configured to execute a supervised prediction model using a linear or non-linear function. For example, the trained prediction model may comprise a decision tree that accepts one or more input features associated with the machine-readable code to provide a confidence score correlating the input to an output (e.g., the efficiency of running the code at first hardware device vs. at a second hardware device).

Prediction model component 118 may implement a neural network that measures the relationship between the dependent variable (e.g., the execution metric of choice, including for example, power efficiency or run time value) and independent variables (e.g., the machine-readable code) by using multiple layers of processing elements that ascertain non-linear relationships and interactions between the independent variables and the dependent variable.

Prediction model component 118 may implement a Deep Learning Neural Network that consists of more than one layer of processing elements between the input layer and the output later, or a Convolutional Neural Network, in which successive layers of processing elements contain particular hierarchical patterns of connections with the previous layer.

Prediction model component 118 may also receive information about temporary characteristics of hardware devices 150 that may be candidates to deploy the dispatching/scheduling and execution of tasks for each function. The temporary characteristics of the computing component may also be stored in service data store 130 to analyze the data over time. For example, at a first time period, a first device may execute instructions at fifty percent capacity and a second device may execute instructions at ninety percent capacity. Prediction model component 118 may predict the availability of these devices to assign deployment of the functions based on which device is likely to have the computing capacity to run additional processes. In another example, the first device may be underutilized or standing by for the instructions to execute, and after being identified, may execute the instructions so that it is no longer underutilized.

In some examples, the prediction model may be used to help tune or adjust performance of the partitions to the compute element. For example, the prediction model may predict what would happen to the system in response to implementing the first deployment and make the adjustments prior to generating a second deployment and sending it to a production system to implement. In some examples, the deployment may be implemented in a testing system (e.g., virtual or physical) prior to sending the code to the production system. As an illustrative process, the system may determine a first deployment of the functions, determine an execution metric (e.g., low precision of data or high precision of data) based on a prediction of how the first deployment would affect the compute, then determine a second deployment that adjusts the execution metric (e.g., changing the precision of data based on the predicted output from the first deployment).

Execution component 120 is configured to implement a deployment of the plurality of functions in the FaaS computing environment. The deployment may be implemented at run-time by executing the machine-readable code by the computing components of the FaaS infrastructure in accordance with the deployment.

The computing components of the FaaS infrastructure may correspond with computing devices that may execute the compiled, executable code corresponding with each function associated with the deployment. The computing components of the FaaS infrastructure that are selected for the deployment may be based on characteristics of each device. For example, execution component 120 can identify a particular computing component that is optimized to pass data from a first computing device to a second computing device along a network path. In another example, hardware module 124 may automatically distribute workloads on the most available processor or accelerator component of the computing device.

Figure 2:
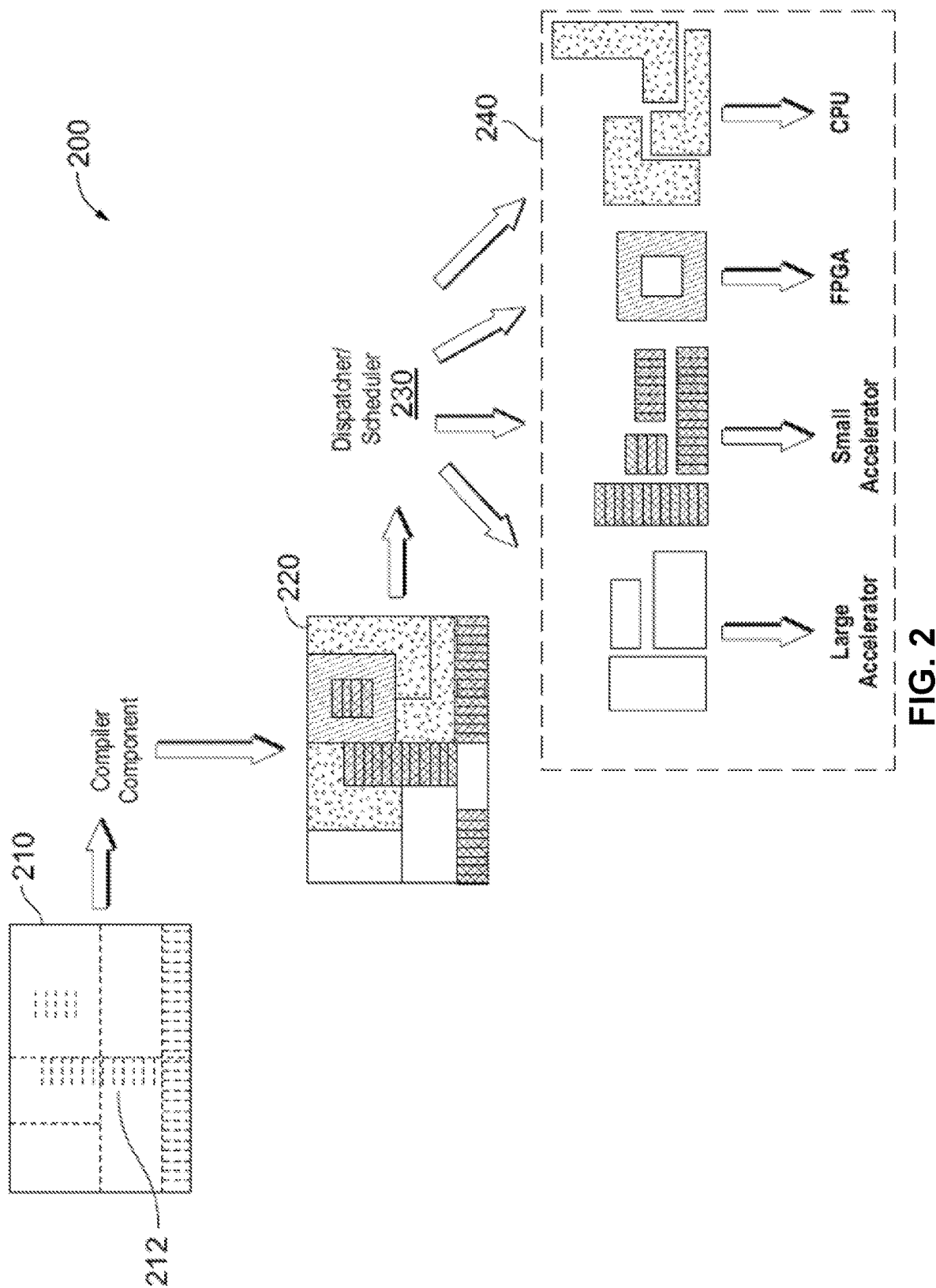
FIG. 2 illustrates a process for program abstractions and dispatcher/scheduler deployments of heterogenous computing systems, in accordance with some examples of the disclosure.

FIG. 2 illustrates a process for compiler-driven program/service abstractions and dispatcher/scheduler deployments of heterogenous computing systems, in accordance with some examples of the disclosure. In example 200, the programmer annotations, decomposed program/server, dispatcher/scheduler, and different hardware devices are provided for illustration.

At block 210, an initial format is illustrated. The initial format may comprise a heterogeneous platform, program, service, or application 212 that is planned for different types of execution. One type of execution may be ideally suited for large accelerators, other for small accelerators, and some for FPGAs. And even if they are not ideally suited for some, they could run more or less effectively on different platforms. In some examples, the initial format may be annotated. The annotation may indicate a partitioning of the heterogeneous platform, program, service, or application using an annotation program.

At block 220, the compiler component may convert the initial format to a decomposed format in association with the annotations, if any are provided. The compiler component may decompose the initial format with potential knowledge of the hardware devices (e.g., underlying architecture), which is illustrated as a large accelerator, small accelerator, FPGA, and CPU.

At block 230, the decomposed format may be provided to a dispatcher/scheduler. The dispatcher/scheduler may identify the hardware devices that are available for executing functions corresponding with the decomposed format. The dispatcher/scheduler may perform the actual decomposition and deployment of the program to each of the hardware devices using the decomposed format as a guide.

At block 240, the decomposed portions of the program may be transmitted to each of the identified hardware devices.

Figure 3:
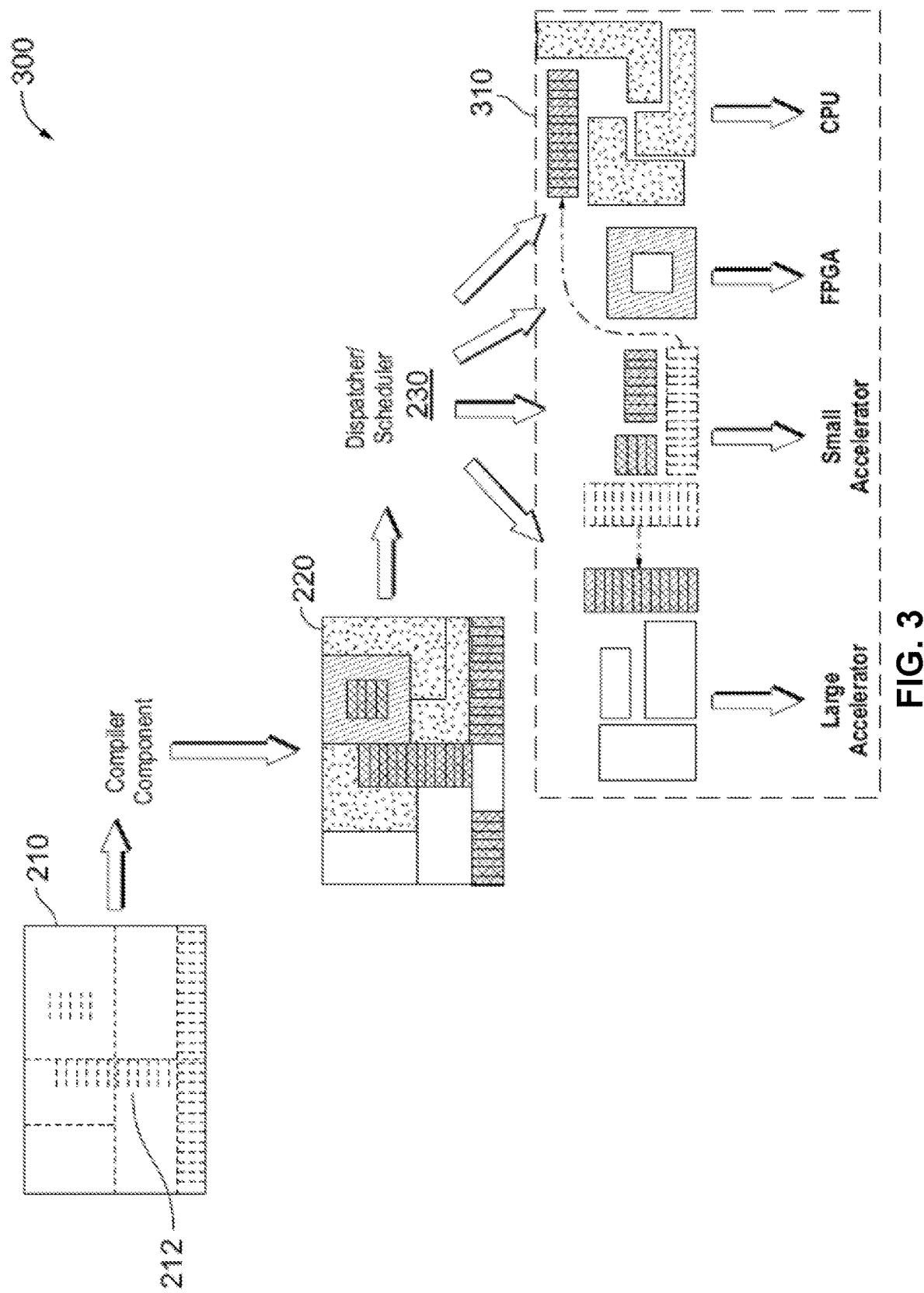
FIG. 3 illustrates a determining a second deployment of heterogenous computing systems, in accordance with some examples of the disclosure.

In some examples, the decomposing of the program/service (block 210) may also decompose the program/service after the compiler activity (block 220) and identify the decomposed portions (block 240). In total, the heterogeneous platform may not be decomposed, but rather the program/service may be decomposed and assigned to portions of the partitioned, heterogeneous platform FIG. 3 illustrates a determining a second deployment of heterogenous computing systems, in accordance with some examples of the disclosure. In example 300, a similar illustration is repeated from FIG. 2, and some of the decomposed portions of the program are adjusted in comparing the first deployment of the plurality of functions with the second deployment of the plurality of functions.

In some examples, program preferences may be accessed from profile data store 132 in FIG. 1 and identify that a preference for function deployment includes minimizing the amount of power used for deployment instead of optimizing or increasing performance capacity. In this example, when a program is received by the system again, it may use annotations that were previously received by the same program (or a close variant), regardless of the user. The decomposed portions of the program may be reassigned to different hardware devices, as shown at block 310.

In each of these examples, the compiler component may decompose a machine-readable code into functions executable by the FaaS computing environment. The decomposition of the program request into suggested functions may identify implementations by the system to utilize serverless, heterogeneity, and the right granularity of abstractions to optimize performance goals set by the user (e.g., power vs. performance based on program preferences). Once the decomposed program is generated, the dispatcher/scheduler may determine a first deployment of the suggested functions, which are executed by computing components of the FaaS infrastructure. The first deployment may consider, at the time of the deployment, inventory of available hardware and utilization of the hardware.

Figure 4:
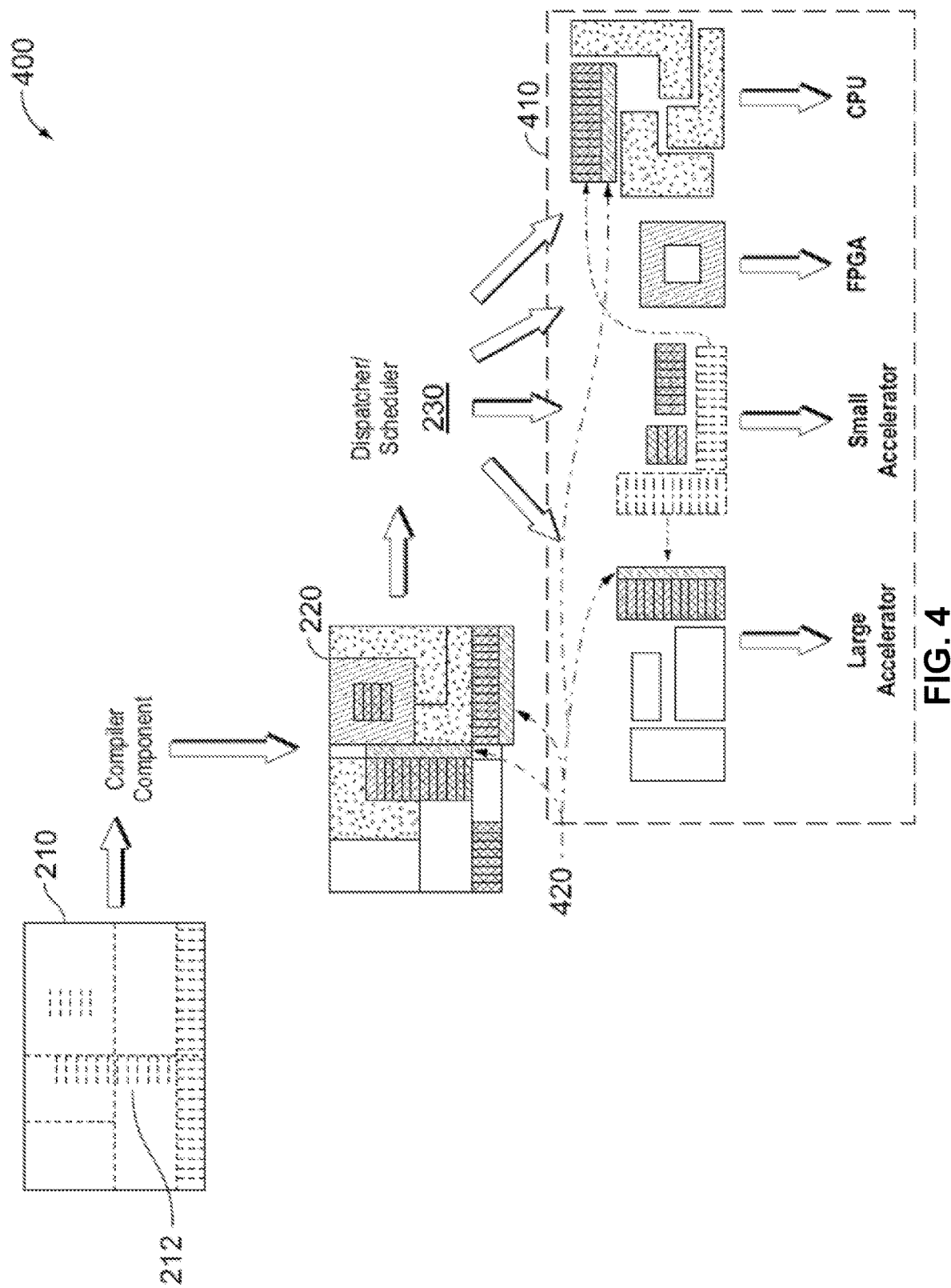
FIG. 4 illustrates a mapping and tuning a process for program abstractions and dispatcher/scheduler deployments of heterogenous computing systems, in accordance with some examples of the disclosure.

FIG. 4 illustrates a mapping and tuning process for compiler-driven program/service abstractions and dispatcher/scheduler deployments of heterogenous computing systems, in accordance with some examples of the disclosure. In example 400, the system may adjust the assignments of decomposed portions of the program by adjusting the assignments of these decomposed portions to different hardware devices, as shown at block 410. Various tunable components 420 may be identified in the decomposed program and assigned to the different hardware devices. During the mapping and tuning process, the system may execute algorithm switching, implement precision reduction, or implement data sparsity conversion.

Figure 5:
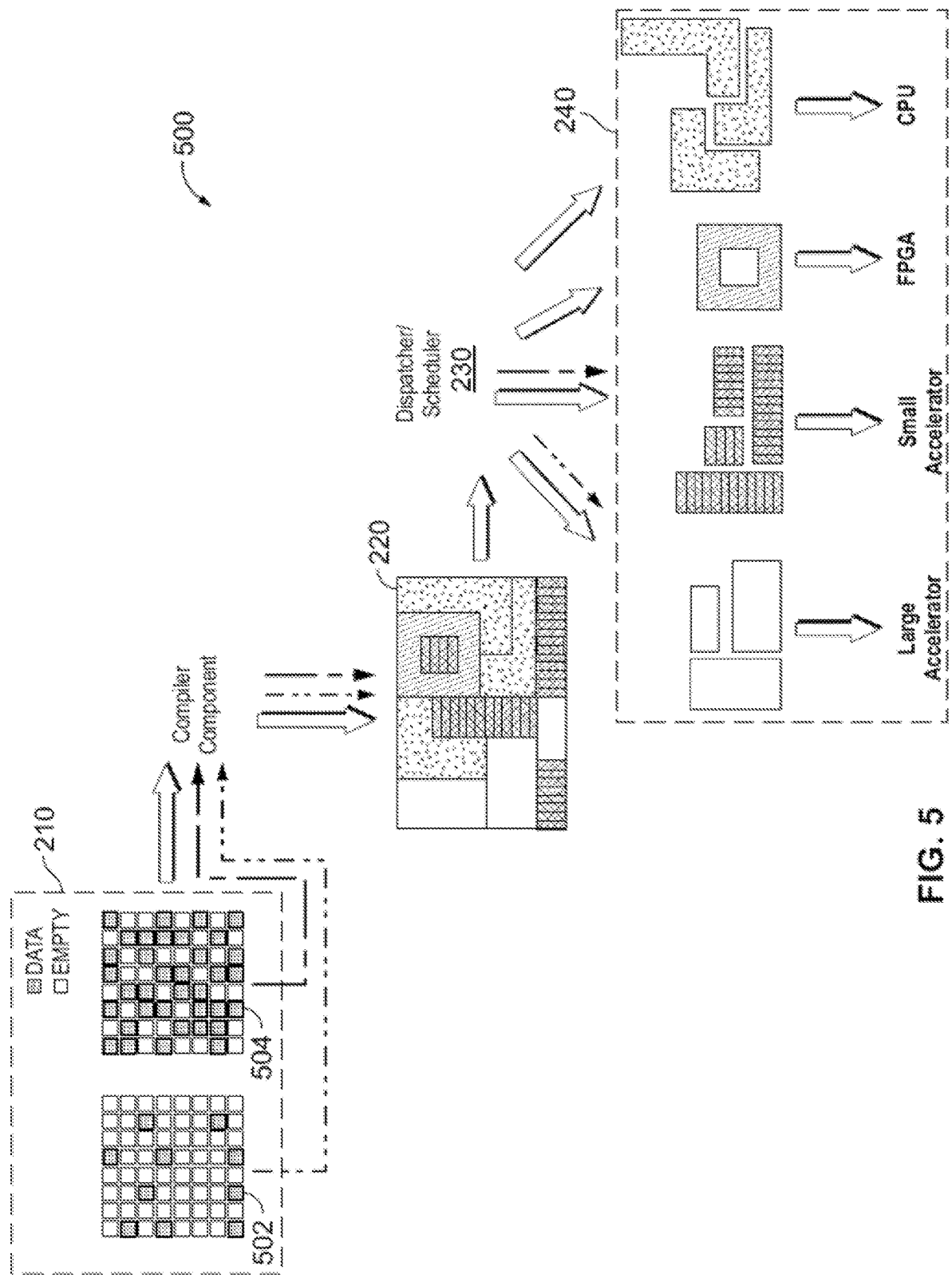
FIG. 5 illustrates a data redistribution or remapping process for program abstractions and dispatcher/scheduler deployments of heterogenous computing systems, in accordance with some examples of the disclosure.

FIG. 5 illustrates a data redistribution or remapping process for compiler-driven program/service abstractions and dispatcher/scheduler deployments of heterogenous computing systems, in accordance with some examples of the disclosure. In example 500, the system may perform a data redistribution process.

During the redistribution or remapping process, the system may execute a data-aware redistribution, remapping, or decomposition to execution units. For example, the system may identify sparse data 502 and dense data 504. The mapping may access the sparse data 502 and map them to appropriate accelerators or other hardware devices (e.g., based on availability to process the data or other metrics discussed throughout the disclosure). The system may steer data-intensive flows onto the accelerators or other hardware devices that can best support it (e.g., lowest latency, greatest processing power, etc.). the system may scale data latency and perform dynamic run-time remapping.

In some examples, the redistribution or remapping process includes the system (or prediction model component 118 of FIG. 1) being able to predict the parts of the composite service that are most suitable to run on which kind of processing units, such as large/medium/small CPUs, GPUs, FPGAs, and accelerators, as well memory types and interconnects. For example, a component may have minimal dependencies, be scale-out friendly (e.g., able to add more memory or other hardware without negatively affecting other execution metrics in the component), communication critical component, or computation critical component.

In some examples, parts of the system may be carved out. Various characteristics of the system may be checked. For example, if there are components that could be decomposed with fine granularity (e.g., below a granularity threshold value), if deploying parts thereof do not conflict with Quality of Service (QOS) metrics, and if there is a benefit of improving performance efficiency (e.g., improved traffic flow by a threshold amount), then carving out parts of the system may be implemented. The carving out may accomplish bin-packing and improving performance. In this phase, the compiler component may determine and direct the decomposition of program components. In some examples, only decomposable components of the system would be identified and actual deployment may be performed in a latter phase of deployment (e.g., at run-time).

Figure 6:
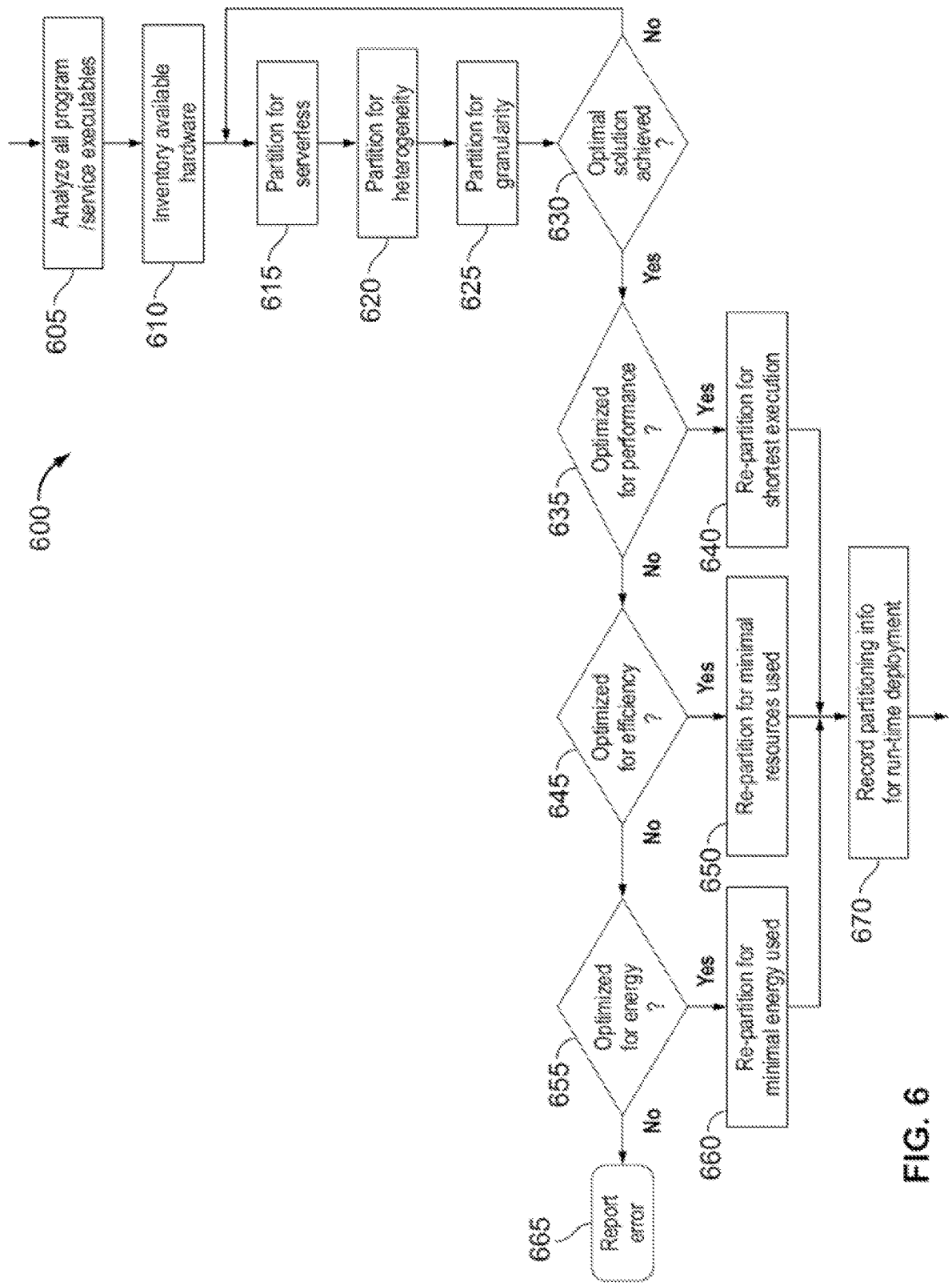
FIG. 6 illustrates a process for decomposing, in accordance with some examples of the disclosure.

FIG. 6 illustrates a process for decomposing, in accordance with some examples of the disclosure. Computing device 100 of FIG. 1 may implement the processes described herein.

At block 605, the system may analyze all program executables.

At block 610, the system may determine an amount of available hardware by generating an inventory of available hardware.

At blocks 615-625, the system may decompose the program from the request into suggested functions to achieve features like serverless, heterogeneity, and the right granularity of abstractions to optimize performance goals set by the user (e.g., power vs. performance based on program preferences).

At block 615, the system may decompose components for serverless features. The system may be serverless to address ease of development, such as no dependencies on OS and only addressing FaaS abstractions. This function can comprise many programs, such as general-purpose programs, HPC applications and services, artificial intelligence (AI) models, data analytics, etc. These components may be suited to run on different hardware and may have different scale-out and performance requirements.

At block 620, the system may decompose the components of the program based on the predicted heterogeneity of the final output. The system may utilize the heterogeneous computing environment by matching the fine-granularity features of serverless implementations to heterogenous computing systems through automated decomposition of programs. At compile time, the scale-out and performance requirements of various program components of the function can run on various heterogeneous hardware.

At block 625, the system may decompose components of the program to increase its computational granularity and utilize features of the system. The system may implement the right granularity of abstractions, at run-time, by matching already decomposed function components to most appropriate available hardware. The selection of the heterogenous computing systems may be determined to optimize speed or accuracy or minimize the number of computing systems that are used to run the function (e.g., based on program preferences).

At block 630, the system may determine if an optimal deployment is achieved. If not, the system may return to block 615. If so, the system may proceed to block 635.

At block 635, the system may continue to optimize the deployment for performance. If the deployment is optimized for performance, the system may proceed to block 640. If this deployment is not optimized for performance, the system may proceed to block 650.

At block 640, the system may re-decompose the components of the deployment for the shortest execution path.

At block 645, the system may continue to optimize the deployment for efficiency. If the deployment is optimized for efficiency, the system may proceed to block 650. If the system is not optimized for efficiency, the system may proceed to block 655.

At block 650, the system may re-decompose the components of the deployment for the minimal resources used.

At block 655, the system may continue to optimize the deployment for energy. If the deployment is optimized for energy, the system may proceed to block 660. If the system is not optimized for energy, the system may proceed to block 665.

At block 660, the system may re-the deployment for the minimal energy used.

At block 665, the system may report an error.

At block 670, the system may record the partitioning in information for run-time deployment.

Figure 7:
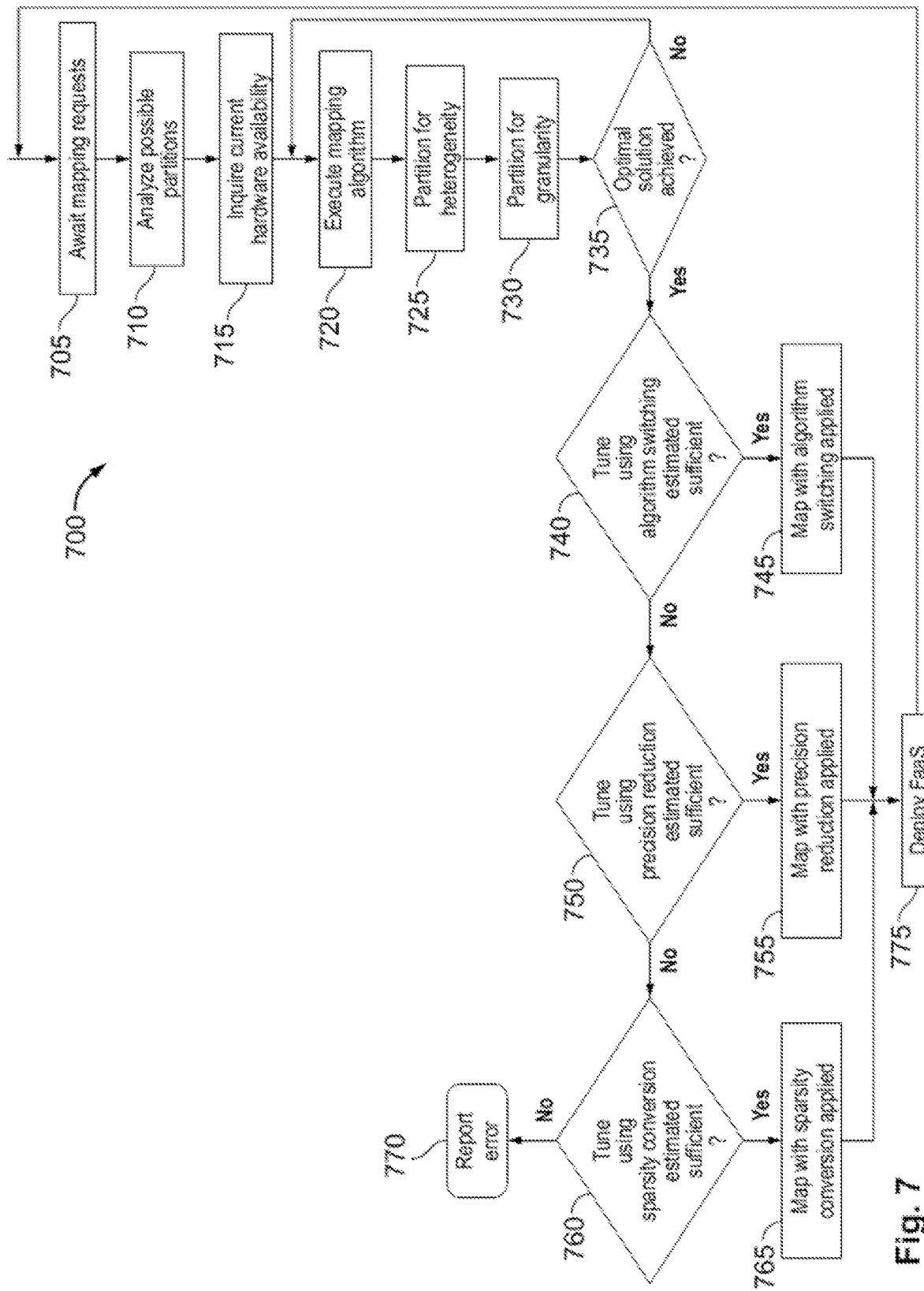
FIG. 7 illustrates a process for mapping, in accordance with some examples of the disclosure.

FIG. 7 illustrates a process for mapping, in accordance with some examples of the disclosure. Computing device 100 of FIG. 1 may implement the processes described herein.

At block 705, the system may await mapping requests.

At block 710, the system may analyze possible decomposed components of the program.

At block 715, the system may determine or inquire about the current hardware availability.

At block 720, the system may execute a mapping algorithm.

At block 725, the system may decompose components of the program for heterogeneity.

At block 730, the system may decompose components of the program for granularity.

At block 735, the system may determine if an optimal deployment is achieved. If not, the system may return to block 720. If so, the system may proceed to block 740.

At block 740, the system may tune the deployment using the algorithm if the algorithm is determined that switching decompositions is predicted to be sufficient by the prediction component. If yes, the system may proceed to block 745. If not, the system may proceed to block 750.

At block 745, the system may adjust the deployment with the algorithm switching applied.

At block 750, the system may tune the deployment using the algorithm if the algorithm is determined that a precision reduction is predicted to be sufficient by the prediction component. If yes, the system may proceed to block 755. If not, the system may proceed to block 760.

At block 755, the system may map the deployment by applying the precision reduction determination.

At block 760, the system may tune the deployment using the algorithm if the algorithm is determined that a sparsity conversion is predicted to be sufficient by the prediction component. If yes, the system may proceed to block 765. If not, the system may proceed to block 770.

At block 765, the system may map the deployment by applying the sparsity conversion determination.

At block 770, the system may report an error.

At block 775, the system may deploy the FaaS computing environment.

In some examples, the adjustment of the execution of the plurality of functions may correspond with communications from a dispatcher/scheduler component to the computing components corresponding with the hardware devices. Not all adjustments may be communicated. Some adjustments may be communicated between the components locally, which may initiate invocations, local procedure calls, or remote procedure calls. In some examples, the remote procedure calls may be mapped to local invocations. If they are invoked across computing components, depending on where the computing components are running or the physical location of the corresponding hardware devices, the procedure calls may be implemented locally or remotely.

In some examples, the computing components are located on the same node of a hardware device, and the computing components may be sharing memory. In this case, the procedure calls may be local procedure calls. In some examples, the computing components are located on different nodes of a hardware device, and the procedure calls may be remote procedure calls (e.g., RPCs).

Figure 8:
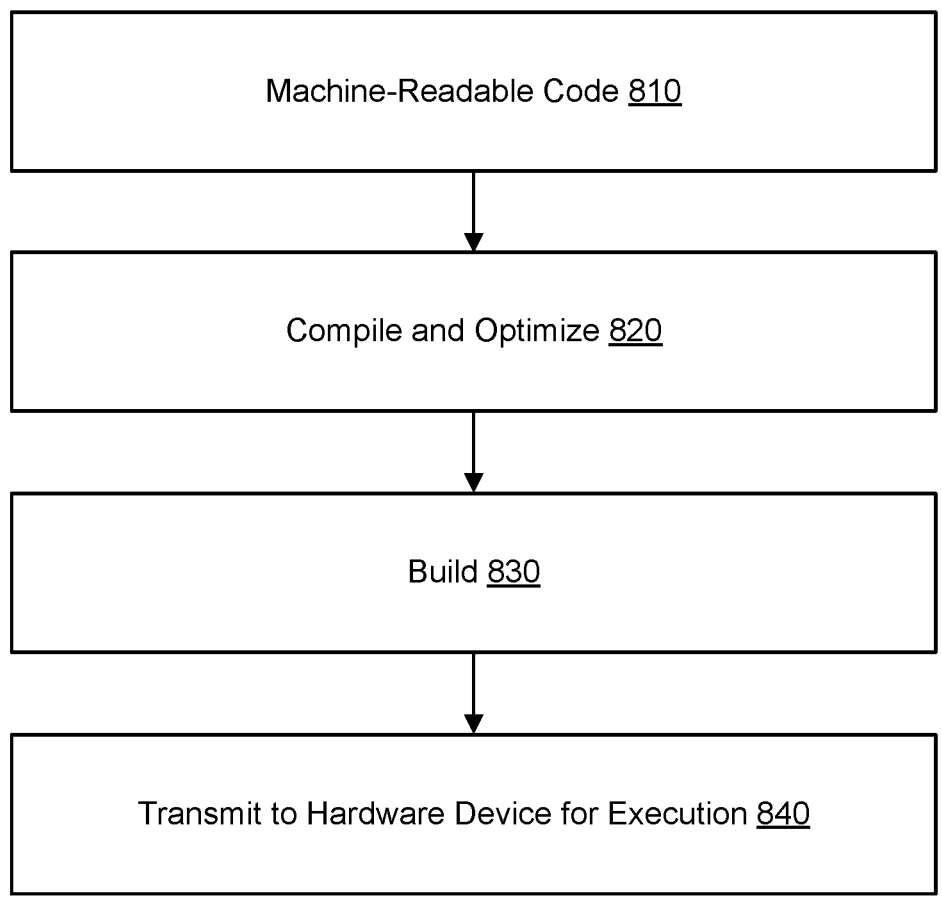
FIG. 8 provides example illustrations of compilers, in accordance with some examples of the disclosure.

FIG. 8 illustrates a process to convert machine-readable code to executable code for a hardware device that may be performed by a compiler component. The processes illustrated may be implemented by compiler component 114 of FIG. 1.

At block 810, machine-readable code can be received. The machine-readable code can include, for example, C or C++, a machine language using the (OpenCL) framework, language using the (CUDA or HIP) toolkit, or other machine-readable language.

At block 820, the machine-readable code can be compiled, synthesized, or optimized by the compiler component.

At block 830, the compiled, machine-readable code can be built into executable code that runs on one or more computing devices with one or more accelerators.

At block 840, the executable code may be used to generate a function call of the FaaS computing environment. Each of the generated functions may correspond with decomposed portions of the overall program identified in the initial request.

Figure 9:
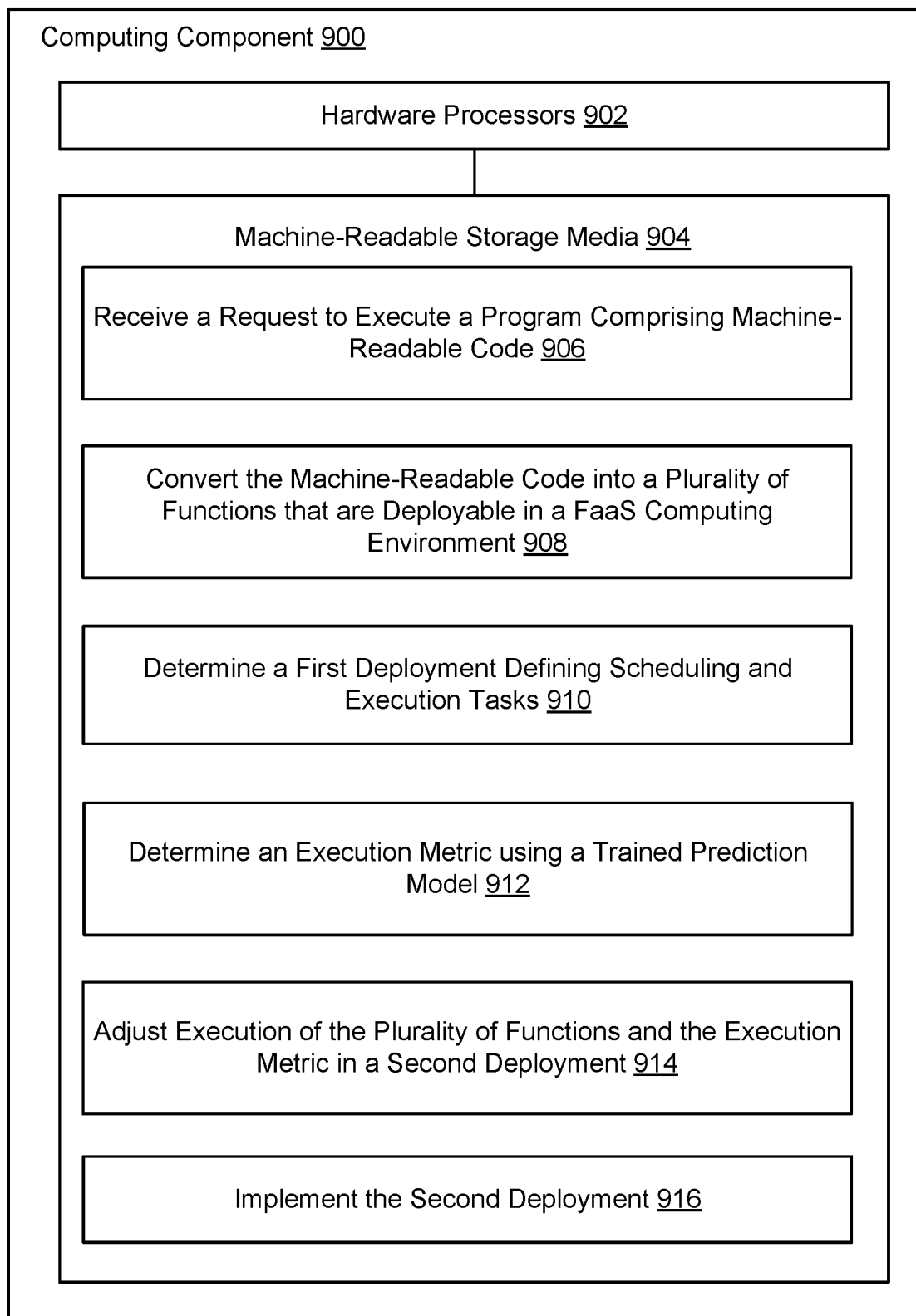
FIG. 9 is an example computing component that may be used to implement various features of embodiments described in the present disclosure.

FIG. 9 illustrates an example computing component that may be used to implement iterative function deployment in a FaaS computing environment in accordance with various embodiments. Referring now to FIG. 9, computing component 900 may be, for example, a server computer, a controller, or any other similar computing component capable of processing data. In the example implementation of FIG. 9, the computing component 900 includes a hardware processor 902, and machine-readable storage medium for 904.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 906-916, to control processes or operations for implementing iterative function deployment in FaaS computing environment. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-916.

Hardware processor 902 may execute instruction 906 to receive a request to execute a program comprising machine-readable code.

Hardware processor 902 may execute instruction 908 to convert the machine-readable code into a function or a plurality of functions. The function(s) may be deployable in the FaaS computing environment.

Hardware processor 902 may execute instruction 910 to determine a first deployment of the plurality of functions in the FaaS computing environment. In some examples, the first deployment may define a scheduling and execution tasks for each function on computing components of the FaaS infrastructure. The first deployment may be determined to deploy at run-time.

Hardware processor 902 may execute instruction 912 to determine an execution metric. The execution metric may be determined using a trained prediction model. In some examples, execution metric may be determined based on an assumption that the execution metric would have been received at run-time if the first deployment were to be executed. In some examples, the execution metric may be determined using a trained prediction model.

Hardware processor 902 may execute instruction 914 to adjust execution of the functions and execution metric in a second deployment of the plurality of functions in the FaaS computing environment. The second deployment may adjust the execution of the plurality of functions and also adjust the execution metric.

Hardware processor 902 may execute instruction 916 to implement the second deployment. The second deployment may be implemented at run-time. In some examples, implementing the second deployment may correspond with the machine-readable code being executed by the computing components of the FaaS infrastructure in accordance with the second deployment that defines the scheduling and execution tasks for each function at run-time.

Figure 10:
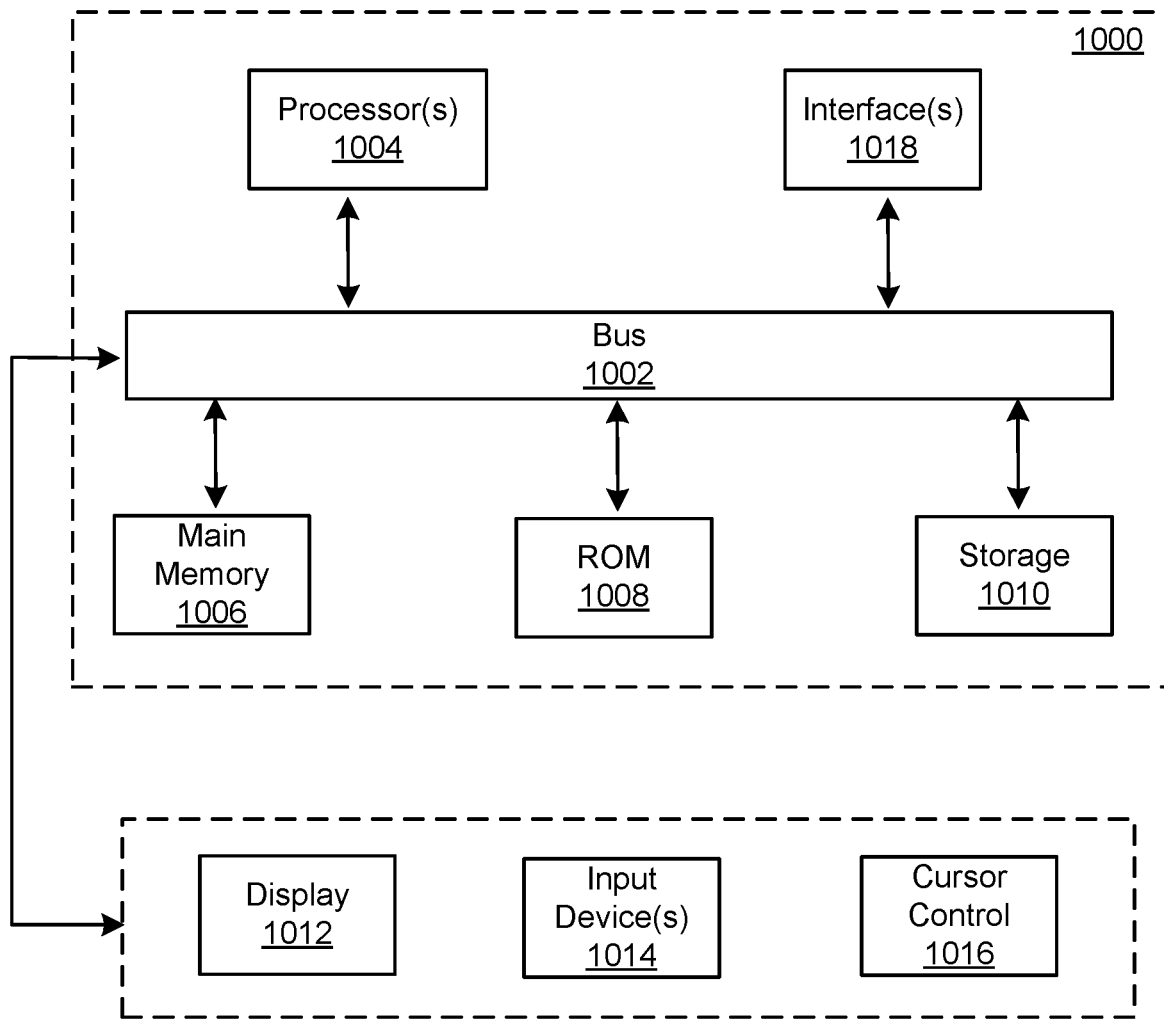
FIG. 10 depicts a block diagram of an example computer system in which various of the embodiments described herein may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Python, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, NVMe drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or wide area network (WAN) component to communicated with a WAN). Wireless links may also be implemented. In any such implementation, communication interface 1018 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local networks and the Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link(s) and communication interface(s) 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving a request to execute a program comprising machine-readable code;
   converting, by a system comprising a hardware processor, the machine-readable code into a plurality of functions that are deployable in a Function-as-a-Service (FaaS) computing environment;

determining, by the system, a first deployment of the plurality of functions in the FaaS computing environment, the first deployment defining scheduling and execution tasks for each function at run-time on computing components of the FaaS computing environment;

determining, by a trained prediction model, an execution metric for the first deployment that corresponds with run-time operations of the first deployment;

adjusting, by the system, execution of the plurality of functions and also adjusting the execution metric in a second deployment of the plurality of functions in the FaaS computing environment; and implementing the second deployment of the plurality of functions in the FaaS computing environment at run-time, the implementing causing execution of the machine-readable code by the computing components of the FaaS computing environment in accordance with the second deployment, wherein the first deployment and the second deployment are determined prior to run-time.

2. The method of claim 1, wherein the computing components of the FaaS computing environment comprise one or more of a set including an accelerator, a Field Programmable Gate Array (FPGA), or a Central Processing Unit (CPU).

3. The method of claim 1, wherein the machine-readable code of the program comprises programmer annotations, and wherein the converting of the machine-readable code into the plurality of functions is based on the programmer annotations.

4. The method of claim 1, wherein the converting and the determining of the first deployment and the second deployment are performed by a compiler in the system.

5. The method of claim 1, wherein the computing components of the FaaS computing environment comprise virtual or physical computing components.

6. The method of claim 1, wherein the converting comprises creating function calls of the plurality of functions in the FaaS computing environment.

7. The method of claim 1, wherein the determining of the second deployment is part of an iterative adjustment, prior to run-time, of a deployment of the plurality of functions in the FaaS computing environment, the iterative adjustment comprising:

inputting a currently adjusted deployment of the plurality of functions starting with the first deployment to the trained prediction model to produce a predicted execution metric for the currently adjusted deployment that corresponds with run-time operations of the currently adjusted deployment, determining a modified deployment of the plurality of functions in the FaaS computing environment, the determining of the modified deployment comprising adjusting an assignment of the plurality of functions to the computing components, and proceeding to a next iteration of the iterative adjustment using the modified deployment as the currently adjusted deployment until the predicted execution metric of the currently adjusted deployment satisfies a threshold.

8. A system comprising:
a processor; and
a non-transitory storage medium storing machine-readable instructions executable on the processor to:
receive a request to execute a program comprising machine-readable code;

convert the machine-readable code into a plurality of functions that are deployable in a Function-as-a-Service (FaaS) computing environment;

determine, prior to run-time of the program, a first deployment of the plurality of functions in the FaaS computing environment, the first deployment defining scheduling and execution tasks for each function at the run-time of the program on computing components of the FaaS computing environment;

determine, by a trained prediction model, an execution metric for the first deployment that corresponds with run-time operations of the first deployment;

determine, prior to the run-time of the program, a second deployment of the plurality of functions in the FaaS computing environment, the determining of the second deployment comprising adjusting an assignment of the plurality of functions to the computing components; and implement the second deployment of the plurality of functions in the FaaS computing environment at the run-time of the program, the implementing causing execution of the machine-readable code by the computing components of the FaaS computing environment in accordance with the second deployment.

9. The system of claim 8, wherein the computing components of the FaaS computing environment comprise one or more of an accelerator, an FPGA, or a CPU.

10. The system of claim 8, wherein the machine-readable code of the program comprises programmer annotations, and the converting of the machine-readable code into the plurality of functions is based on the programmer annotations.

11. The system of claim 8, wherein the converting and the determining of the first deployment and the second deployment are performed by a compiler in the system.

12. The system of claim 8, wherein the computing components of the FaaS computing environment comprise virtual or physical computing components.

13. The system of claim 8, wherein the converting comprises creating function calls of the plurality of functions in the FaaS computing environment.

14. The system of claim 8, wherein the machine-readable instructions are executable on the processor to:

determine the second deployment as part of an iterative adjustment, prior to the run-time of the program, of a deployment of the plurality of functions in the FaaS computing environment, the iterative adjustment comprising:

inputting a currently adjusted deployment of the plurality of functions starting with the first deployment to the trained prediction model to produce a predicted execution metric for the currently adjusted deployment that corresponds with run-time operations of the currently adjusted deployment, determining a modified deployment of the plurality of functions in the FaaS computing environment, the determining of the modified deployment comprising adjusting an assignment of the plurality of functions to the computing components, and proceeding to a next iteration of the iterative adjustment using the modified deployment as the currently adjusted deployment until the predicted execution metric of the currently adjusted deployment satisfies a threshold.

15. A non-transitory computer-readable storage medium comprising instructions that upon execution cause a system to:

receive a request to execute a program comprising machine-readable code;

convert the machine-readable code into a plurality of functions that are deployable in a Function-as-a-Service (FaaS) computing environment;

determine, prior to run-time of the program, a first deployment of the plurality of functions in the FaaS computing environment, the first deployment defining scheduling and execution tasks for each function at the run-time of the program on computing components of the FaaS computing environment;

determine, by a trained prediction model, an execution metric for the first deployment that corresponds with run-time operations of the first deployment;

determine, prior to the run-time of the program, a second deployment of the plurality of functions in the FaaS computing environment, the determining of the second deployment comprising adjusting an assignment of the plurality of functions to the computing components; and implement the second deployment of the plurality of functions in the FaaS computing environment at the run-time of the program, the implementing causing execution of the machine-readable code by the computing components of the FaaS computing environment in accordance with the second deployment.

16. The non-transitory computer-readable storage medium of claim 15, wherein the computing components of the FaaS computing environment comprise one or more of an accelerator, an FPGA, or a CPU.

17. The non-transitory computer-readable storage medium of claim 15, wherein the machine-readable code of the program comprises programmer annotations, and the converting of the machine-readable code into the plurality of functions is based on the programmer annotations.

18. The non-transitory computer-readable storage medium of claim 15, wherein the converting and the determining of the first deployment and the second deployment are performed by a compiler in the system.

19. The non-transitory computer-readable storage medium of claim 15, wherein the converting comprises creating function calls of the plurality of functions in the FaaS computing environment.

20. The non-transitory computer-readable storage medium of claim 15, wherein the instructions upon execution cause the system to:

determine the second deployment as part of an iterative adjustment, prior to the run-time of the program, of a deployment of the plurality of functions in the FaaS computing environment, the iterative adjustment comprising:

inputting a currently adjusted deployment of the plurality of functions starting with the first deployment to the trained prediction model to produce a predicted execution metric for the currently adjusted deployment that corresponds with run-time operations of the currently adjusted deployment, determining a modified deployment of the plurality of functions in the FaaS computing environment, the determining of the modified deployment comprising adjusting an assignment of the plurality of functions to the computing components, and proceeding to a next iteration of the iterative adjustment using the modified deployment as the currently adjusted deployment until the predicted execution metric of the currently adjusted deployment satisfies a threshold.

* * * * *